US008665319B2

(12) United States Patent
Mishima et al.

(10) Patent No.: US 8,665,319 B2
(45) Date of Patent: Mar. 4, 2014

(54) PARALLAX IMAGE GENERATING APPARATUS AND METHOD

(75) Inventors: Nao Mishima, Inagi (JP); Takeshi Mita, Yokohama (JP); Kenichi Shimoyama, Tokyo (JP); Ryusuke Hirai, Tokyo (JP); Masahiro Baba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 225 days.

(21) Appl. No.: 12/888,582

(22) Filed: Sep. 23, 2010

(65) Prior Publication Data

US 2011/0242280 A1    Oct. 6, 2011

(30) Foreign Application Priority Data

Mar. 31, 2010  (JP) ................................. 2010-084326

(51) Int. Cl.
*H04N 13/02*    (2006.01)
(52) U.S. Cl.
USPC ........................................................... 348/46
(58) Field of Classification Search
None
See application file for complete search history.

(56) References Cited

U.S. PATENT DOCUMENTS

| | | | | |
|---|---|---|---|---|
| 6,445,833 | B1* | 9/2002 | Murata et al. | 382/285 |
| 6,590,573 | B1* | 7/2003 | Geshwind | 345/419 |
| 6,940,473 | B2* | 9/2005 | Suyama et al. | 345/6 |
| 7,403,201 | B2* | 7/2008 | Takemoto et al. | 345/419 |
| 2005/0219239 | A1* | 10/2005 | Mashitani et al. | 345/419 |
| 2005/0253924 | A1* | 11/2005 | Mashitani | 348/42 |
| 2006/0050383 | A1* | 3/2006 | Takemoto et al. | 359/462 |
| 2006/0066718 | A1* | 3/2006 | Yanagawa et al. | 348/51 |
| 2007/0216975 | A1* | 9/2007 | Holmes | 359/2 |
| 2008/0225113 | A1* | 9/2008 | Saishu et al. | 348/51 |
| 2009/0027571 | A1* | 1/2009 | Amano | 348/744 |

FOREIGN PATENT DOCUMENTS

| | | |
|---|---|---|
| CN | 101640809 A | 2/2010 |
| JP | 2001-320731 | * 11/2001 |
| JP | 2004-102689 | 4/2004 |
| JP | 2005-151534 | 6/2005 |
| JP | 2007-219765 | 8/2007 |
| JP | 2007-299070 | 11/2007 |

OTHER PUBLICATIONS

Notice of Reasons for Rejection issued by the Japanese Patent Office in Japanese Patent Application No. 2010-084326, mailed Dec. 28, 2011 (5 pages).
Cheng, C. C. et al., "A Quality-Scalable Depth-Aware Video Processing System," 11.4, SID 09 Digest, pp. 123-126, (2009).

(Continued)

*Primary Examiner* — Joseph Ustaris
*Assistant Examiner* — Zhubing Ren
(74) *Attorney, Agent, or Firm* — Finnegan, Henderson, Farabow, Garrett & Dunner, LLP (57) ABSTRACT

According to one embodiment, a parallax image generating apparatus is for generating, using a first image, a parallax images with a parallax therebetween. The apparatus includes following units. The first estimation unit estimates distribution information items indicating distributions of first depths in the first image by using first methods. The distribution information items falls within a depth range to be reproduced. The first combination unit combines the distribution information items to generate first depth information. The second calculation unit calculates second depth information indicating relative unevenness of an object in the first image. The third combination unit combines the first depth information and the second depth information by using a method different from the first methods, to generate third depth information. The generation unit generates the parallax images based on the third depth information and the first image.

9 Claims, 7 Drawing Sheets

(56) References Cited

OTHER PUBLICATIONS

First Office Action mailed by the Japanese Patent Office on Dec. 28, 2011, in the corresponding Japanese Application No. 2010-084326, 2 pages.
First Office Action mailed by the Japanese Patent Office on Mar. 7, 2012, in Japanese Application No. 2011-024192, 2 pages.
Final Office Action mailed by the Japanese Patent Office on May 24, 2012, in Japanese Application No. 2011-024192, 1 page.
Second Office Action mailed by the Chinese Patent Office on Oct. 25, 2013, in counterpart Chinese Application No. CN201010567069.4; (19 pgs.) and English translation thereof.

* cited by examiner

PARALLAX IMAGE GENERATING APPARATUS AND METHOD

CROSS-REFERENCE TO RELATED APPLICATIONS

This application is based upon and claims the benefit of priority from Japanese Patent Application No. 2010-084326, filed Mar. 31, 2010; the entire contents of which are incorporated herein by reference.

FIELD

Embodiments described herein relate generally to a parallax image generating apparatus and method.

BACKGROUND

There are known techniques of estimating depths in an image, based on a two-dimensional image (a still image, moving image, etc.), and generating a parallax image based on the information indicating the estimated depths.

For example, JP-A 2005-151534 (KOKAI) discloses a method of blending models corresponding to the depth (i.e., perceivable depth) information items of a plurality of images in accordance with high-frequency components in the images, and adding a red signal as a color signal of the images to the resultant depth model to obtain final depth (i.e., perceivable depth) information. Further, C.-C. Cheng, C.-T. Li, Y.-M. Tsai and L.-G. Chen, "A Quality-Scalable Depth-Aware Video Processing System," SID2009 discloses a method of acquiring depth (i.e., perceivable depth) information items on the entire image by estimation using three methods, and subjecting the acquired three depth information items to weighted averaging to generate final depth information.

DETAILED DESCRIPTION

In general, according to one embodiment, a parallax image generating apparatus is for generating, using a first image, a parallax images with a parallax therebetween. The apparatus includes following units. The first estimation unit estimates distribution information items indicating distributions of first depths in the first image by using first methods. The distribution information items falls within a depth range to be reproduced. The first combination unit combines the distribution information items to generate first depth information. The second calculation unit calculates second depth information indicating relative unevenness of an object in the first image. The third combination unit combines the first depth information and the second depth information by using a method different from the first methods, to generate third depth information. The generation unit generates the parallax images based on the third depth information and the first image.

Embodiments will be described in detail with reference to the accompanying drawings. In the embodiments, like reference numbers denote like elements, and duplication of descriptions will be omitted.

First Embodiment

A first embodiment relates to an apparatus for generating, using an image, at least one parallax image with a parallax therebetween from a first two-dimensional image (including a still image and a moving image). Although in the embodiment below, a method generating two parallax images, the embodiment is not limited to this. For instance, when stereoscopic vision is realized for naked eyes, parallax images corresponding, in number, to observing points may be generated.

Figure 1A:
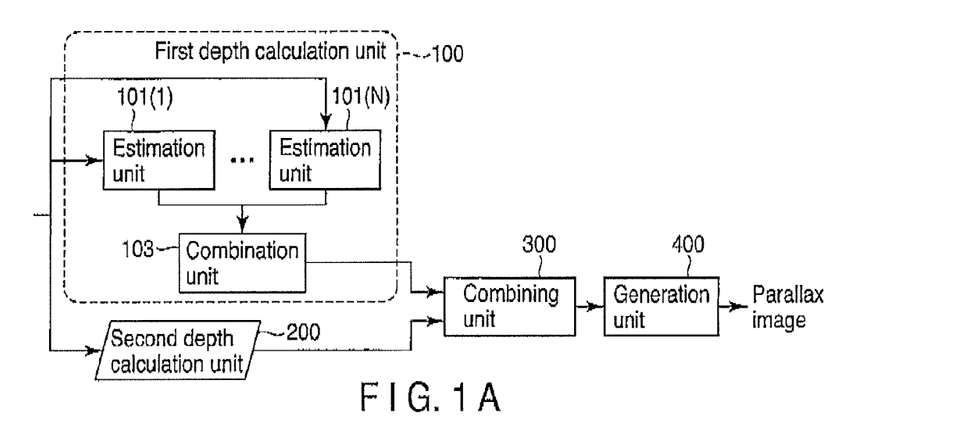
FIGS. 1A and 1B are block diagrams each illustrating a parallax image generating apparatus according to a first embodiment.

FIG. 1A is a block diagram illustrating the parallax image generating apparatus of the first embodiment. As shown, the parallax image generating apparatus comprises a first depth calculation unit 100, a second depth calculation unit 200, a combining unit 300, and a generation unit 400. Hereinafter, "depth," "unevenness," etc., mean perceivable depth, unevenness, etc.

The first depth calculation unit 100 includes N (≥2) or more estimation units 101(1) to 101(N), and a combination unit 103.

The estimation units 101(1) to 101(N) estimate, using different methods, distributions of depths in a three-dimensional reproduction range defined by a front plane and a rear plane, the depths in the reproduction range corresponding to those in the first image. After that, the estimation units output data items indicating the estimated distributions.

The combination unit 103 combines the data items to generate first depth information.

The second depth calculation unit 200 calculates second depth information indicating relative unevenness in an object area in the first image. The object area is the area of the first image that includes an object.

The distribution information indicates absolute depths in the depth reproduction range of the entire image, while the unevenness information indicates relative depths in the object. Namely, the depth range reproduced based on the distribution information is any part of the reproduction range, whereas the depth range reproduced based on the unevenness information is narrower than the reproduction range.

The combining unit 300 combines the first and second depth information items to generate third depth information. The combining unit 300 combines the depth information using a method different from that of the combination unit 103. This will be described later in detail.

The generation unit 400 generates a parallax image based on the third depth information and the first image. Any known technique may be used to generate a parallax image from depth information.

Figure 1B:
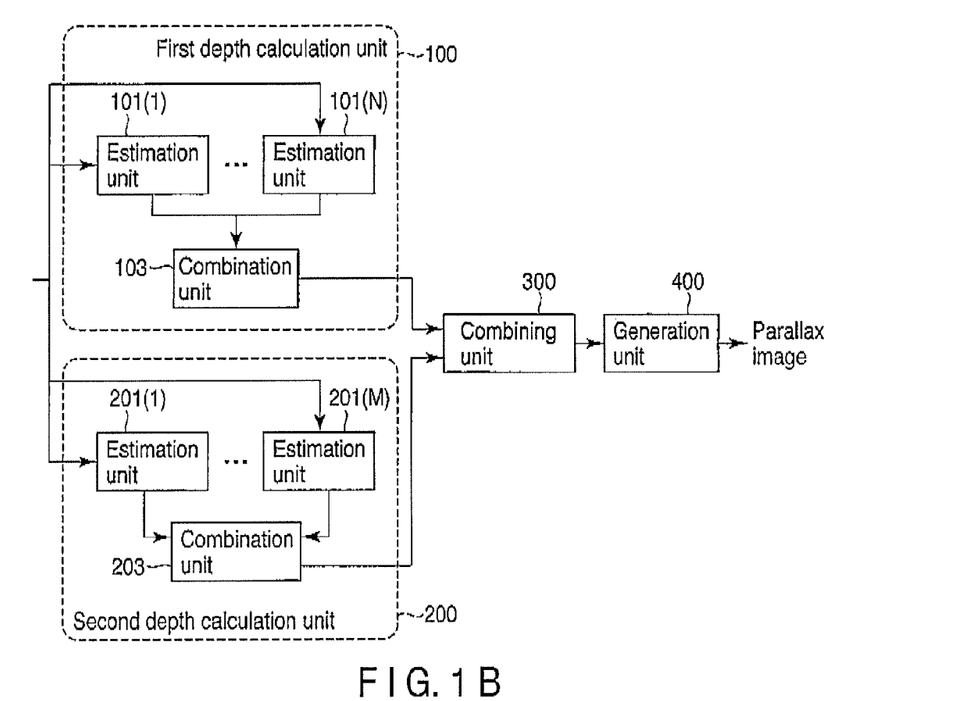

FIG. 1B shows a modification of the parallax image generating apparatus of the first embodiment. This modification differs from the first embodiment shown in FIG. 1A in that in the former, the second depth calculation unit 200 comprises M ($\geq 2$) or more estimation units 201(1) to 201(M), and a combination unit 203.

The estimation unit 201(m) ($1 \leq m \leq M$) detects a target object in a first image, estimates unevenness corresponding to the type of the detected object, and outputs unevenness information indicating the estimated unevenness. Further, the estimation units 201(1) to 201(M) may detect the same object by M different methods, and acquire unevenness information items related to the detection results by the same estimation method. Alternatively, the estimation units 201(1) to 201(M) may detect the same object by the same method, and acquire unevenness information items related to the detection result by M different methods.

The combination unit 203 combines the unevenness information items output from the estimation units 201(1) to 201(M).

A description will now be given of the operation of the parallax image generating apparatus of the first embodiment, using the structure of FIG. 1B as an example for convenience sake.

Figure 2:
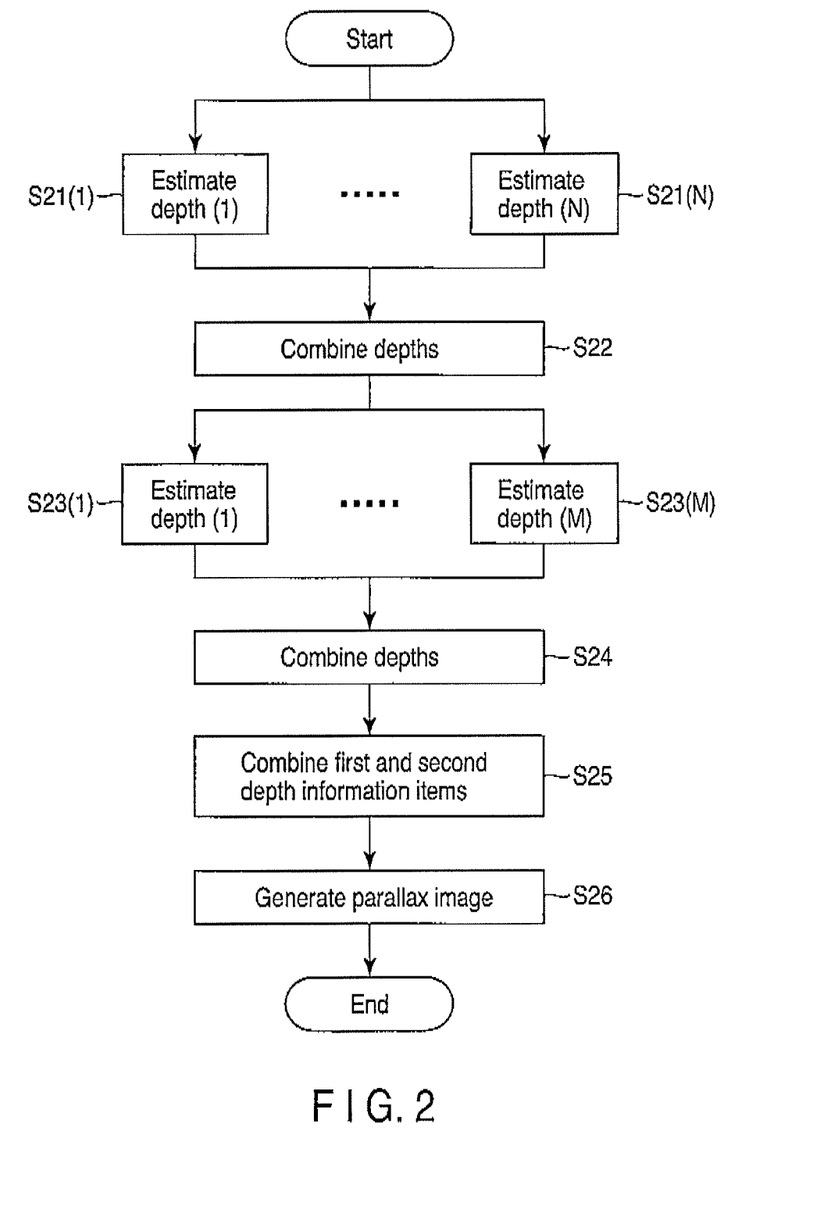
FIG. 2 is a flowchart useful in explaining the operation of the parallax image generating apparatus of the first embodiment.

FIG. 2 shows the operation of the parallax image generating apparatus of the first embodiment. Assume here that the reproduction range of depths in the three-dimensional space realized by the parallax image generated by the following steps is $0 \leq z \leq Z$, where z represents depth information, $z=0$ indicates the perceivable front position (the perceivably shallowest position) of the reproduction range, and $z=Z$ indicates the perceivable rearmost position (the perceivably deepest position) of the reproduction range. The perceivable front position and the perceivable rear(most) position will hereinafter be referred to simply as "the front position" and "the rear(most) position," respectively.

The estimation units 101(1) to 101(N) acquire, by estimation using different methods, respective depth distribution information items corresponding to a depth distribution in a first image in the three-dimensional reproduction range (S21(1)-(N)). At step S21(n), the estimation unit 101(n) acquires depth distribution information by estimation ($1 \leq n \leq N$). To acquire depth distribution information by estimation, a method of preparing preset depth models and appropriately using them in accordance with the first image may be employed.

Figure 3A:
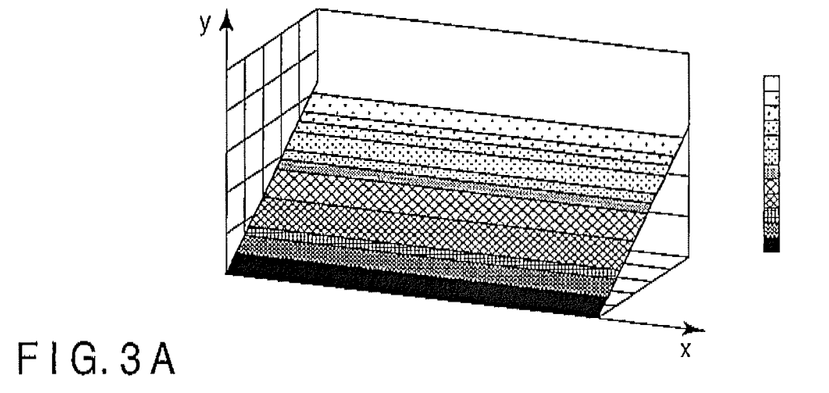
FIG. 3A is a view illustrating an example of a depth model corresponding to distribution information.

FIG. 3A shows a model of depth distribution information. In FIG. 3A, the x- and y-axes indicate the position in an image, the white area indicates the rearmost area (which defines the rear plane of a reproduction range), and the darker areas indicate the areas closer to the front plane (i.e., perceivable front plane). Alternatively, a method may be employed, in which motion between a first image and a second image to be displayed at a time different from the display time of the first image is detected, and a depth distribution is estimated based on the detected motion. Yet alternatively, a method of estimating a depth distribution in accordance with a particular pixel value pattern may be employed. Namely, step 21(n) may employ any type of estimation method, if the method can acquire depth distribution information concerning the entire first image. The depth $Z_n$ at a pixel position (x, y) in the distribution information obtained at the $n^{th}$ step S21(n) ($1 \leq n \leq N$) is defined as described below. Note that $0 \leq Z_n(x, y) \leq Z$.

The combination unit 103 combines a plurality of distribution information items acquired by the estimation units 101(1) to 101(N) to form first depth information (S22). In this depth information combination step, N depth information items are combined to generate a single first depth information item. In computer graphics, when two depths are combined, those near the camera are selected and combined. This is based on the ray trace idea, namely, based on the principle that the light entering the eyes is the light that was not interrupted. Also in this step, the depths closer to the front plane are selected and combined. Since the shallower depths indicate the positions closer to the front plane, the first depth information is acquired by selecting a minimum value as follows:

$$zc(x,y)=\min\{z_1(x,y),\ldots,z_N(x,y)\}$$

where zc (x, y) indicates first depth information at a pixel position (x, y), and min {a, b, c . . . } indicates the operation of selecting the minimum value from {a, b, c . . . }. Alternatively, the first depth information may be obtained by averaging the N depth information items, although this is not preferable to ray trace.

The estimation units 201(1) to 201(M) detect target objects in the first image, and acquire, by estimation, uneven information items corresponding to the types of the detected objects (S23(1)-S23(M)). At step S23(m), the estimation unit 201(m) estimates unevenness ($1 \leq m \leq M$). More specifically, each estimation units 201 detects a target object in the first image, and allocates, to the area of the detected object, an unevenness model preset in accordance with the type of the object, thereby calculating second depth information. In the first embodiment, a description will be given of a method of detecting the position and size of a face existing in the first image, and allocating a preset relative depth model to the detected position. By this, appropriate unevenness can be set in the object area.

Figure 3B:
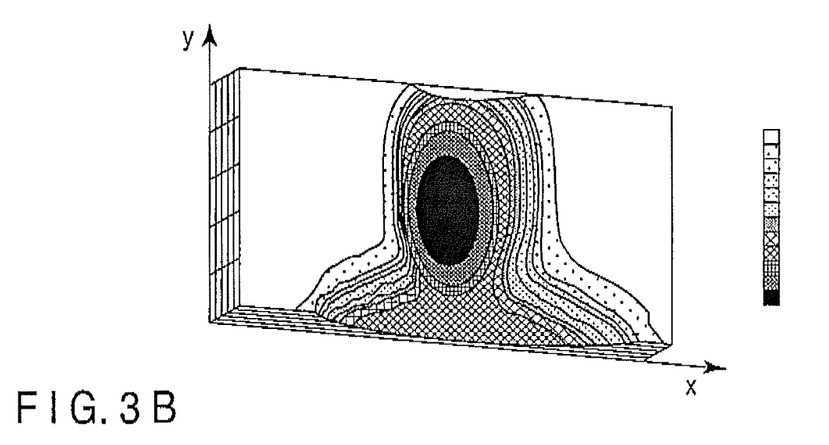
FIG. 3B is a view illustrating an example of a depth model corresponding to unevenness information.

FIG. 3B shows an example of a model. In this case, the model is formed of the face and upper body of a person. In FIG. 3B, the x- and y-axes indicate the position in the image. The white area indicates the rearmost area, and the darker areas indicate the areas closer to the front plane. Other objects may be detected as well as the face, and depth models corresponding thereto be assigned. The object to be detected is not limited to the face, but may be the entire body of a person, an animal, a vehicle, etc. In the first embodiment, a description will be given of the detection of a vehicle as well as the face.

The unevenness information corresponding to the pixel position (x, y) and acquired by estimation at step S23(m) is defined as follows: Assume that $-Z_r \leq r_m(x, y) \leq Z_r$, where $r_m(x, y)$ indicates the state in which there is no unevenness, $-Z_r$ indicates a relatively forward projecting state in the object area, and $Z_r$ indicates a relatively rearward projecting state in the object area. $Z_r$ can be determined based on the size of the detected object. For example, if the object is larger, the relative depth appears to be greater, and hence $Z_r$ is set larger. In contrast, if the object is smaller, $Z_r$ is set smaller. Further, $Z_r$ may be determined based on the first depth information corresponding to the position of the object. In this case, if the first depth information indicates the front position, $Z_r$ is set larger, whereas if it indicates the rear position, $Z_r$ is set smaller.

The combination unit 203 combines the unevenness information items generated by the estimation units 201(1) to 201(M) to generate second depth information (S24). In the computer graphics, to combine two depths, those near the camera are selected and combined. This is based on the ray trace idea, namely, based on the principle that the light entering the eyes is the light that was not interrupted. At step S24, the depths closer to the front plane are selected and combined, as at step S22. Since in the depth information, the lower values indicate the positions closer to the front plane, the second depth information can be acquired by selecting a minimum value as follows:

$$r_c(x,y) = \min\{r_1(x,y), \ldots, r_M(x,y)\}$$

where $r_c(x, y)$ indicates second depth information at a pixel position $(x, y)$. Alternatively, the second depth information may be obtained by averaging the M unevenness information items, although this is not preferable to ray trace.

Yet alternatively, unevenness information items may be combined based on the first depth information. Assuming that the first depth information items at the centers of gravity of the objects that provide the unevenness information items are gravity-center depth information items, unevenness information at which gravity-center depth information corresponding to a position closest to the front plane is obtained may be selected as the unevenness information obtained at a position included in the area in which objects (e.g., a man and a vehicle) overlap each other.

The combining unit 300 combines the first and second depth information items to generate third depth information (S24). For combination, the combining unit 300 uses a method different from those of the combination units 103 and 203.

To express depth information by adding relative unevenness information in the object area to the first depth information indicating the absolute depth distribution in the first image, the first and second depth information items are summed up to generate the third depth information.

$$zf(x,y) = zc(x,y) + rc(x,y)$$

where $zf(x, y)$ indicates third depth information at a pixel position $(x, y)$. Further, multiplication may be executed instead of addition $(zf(x, y) = zc(x, y) \cdot rc(x, y))$.

It is possible that the result of the combination of the first and second depth information items will depart from the desired depth reproduction range of $0 \leq z \leq Z$ in the three-dimensional space. To avoid this, it is preferable to adjust the third depth information so as not to depart from the desired depth reproduction range.

Based on the third depth information and the first image, the generation unit 400 generates a parallax image (S25). Firstly, a parallax vector is calculated from the third depth information. A detailed description will now be given of a method example of generating the parallax image.

Figure 4:
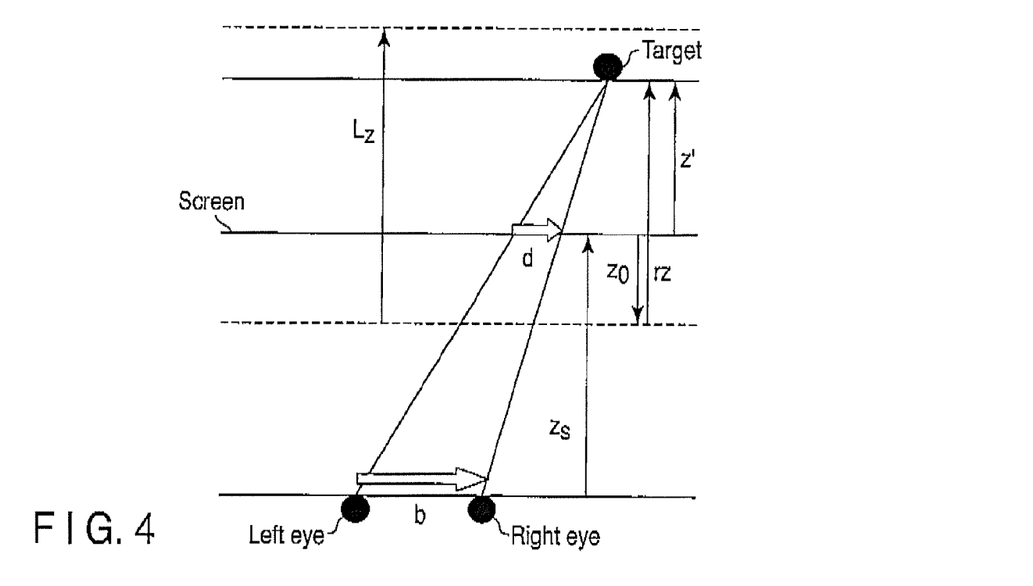
FIG. 4 is a view useful in explaining a method of calculating a parallax vector from depth information.

FIG. 4 is a view useful in explaining a method of calculating a parallax vector from depth information. The parallax vector can be calculated using the similarity between a triangle connecting the right and left eyes and an object to each other, and a triangle connecting the right and left parallaxes and the object to each other. The final depth information is indicated by zf, and the dimension of the parallax vector is indicated by d [cm]. Similarly, the distance between the eyes, the distance to the screen, the distance between the screen and the front position in the real space, and the depth in the real space are indicated by b [cm], $z_s$ [cm], $z_0$ [cm], and $L_z$ [cm], respectively.

The transform from the pixel site to the real-space size [cm] is executed in the manner described below.

$$d_{pixel} = (\text{screen resolution[pixel]/screen size[cm]}) \cdot d \text{ [cm]}$$

Assume here that the depth information zf indicates the range of 0 to Z (the range of 0 to 1 may be used), 0 indicating the front position, Z indicating the rearmost position. However, these values are tentative ones, and must be converted into real distances. Using the real-space distance $L_z$, the depth information is transformed into a real-space distance. This transform is realized by the following transform equation:

$$\gamma = L_z/z_{max} \text{[cm]}$$

where $z_{max} = Z$. In this case, the distance z' between the screen and the object is given by $$z' = \gamma zf - z_0$$

From the similarity between the triangles, the following relationship is established:

$$d:b = (z'):(z_s + z') \quad (1)$$

$$d(z_s + z') = bz' \quad (2)$$

$$z = \{(b-d)z_0 + dz_s\}/\{\gamma(b-d)\} \quad (3)$$

The above depth transform model is inversely proportional to the parallax vector. However, a function model may be employed in which, for example, part of the inversely proportional relationship is approximated by a proportional relationship.

The above parameters b, $z_s$, $z_0$ and $L_z$ for stereoscopic vision can be arbitrarily determined in accordance with a stereoscopic vision to provide. For instance, $z_s$ is determined based on the actual position of the screen, and $z_0$ is set greater if the degree of protrusion is to be increased. Further, the depth can be determined from $L_z$.

Once the parameters for stereoscopic vision are determined, the parallax vector can be calculated from depth information in accordance with the depth parallax vector transform model given by the following equations that are obtained by modifying the above equations (1) to (3) (the unit of d is [cm]):

$$d:b = (z'):(z_s + z')$$

$$d = b\{z'/(z_s + z')\}$$

Figure 5:
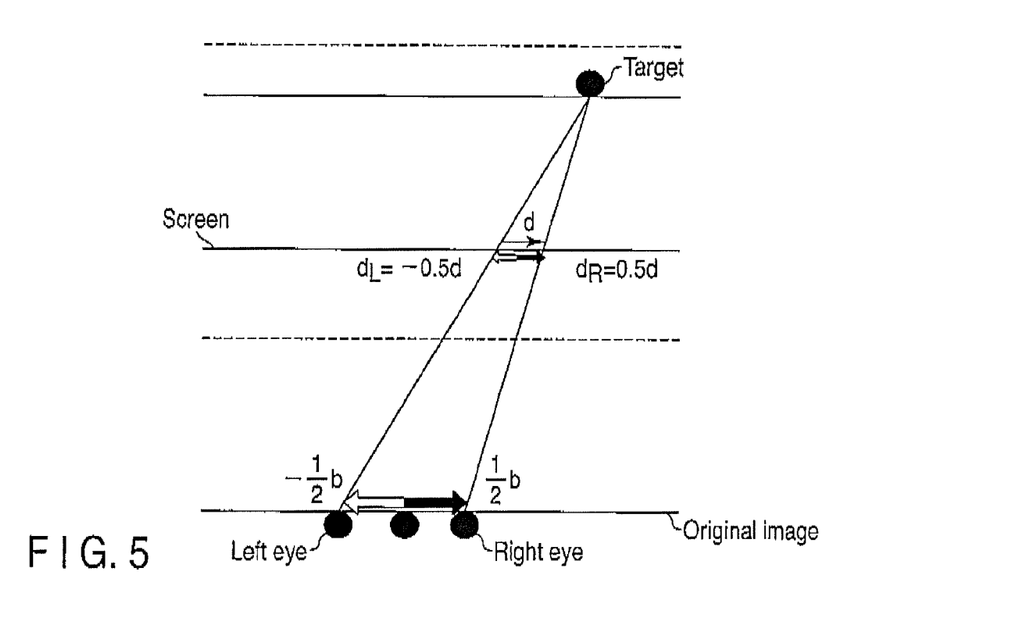
FIG. 5 is a view useful in explaining a method of calculating a parallax image from the parallax vector.

FIG. 5 is a view useful in explaining a method of generating a parallax image from the calculated parallax image. Assuming that the first image is obtained from an observing point positioned between the right and left eyes, the right parallax image and the left parallax image can be generated from parallax vectors $d_L$ and $d_R$ obtained by multiplying the parallax vector d by $-\frac{1}{2}$ and $\frac{1}{2}$, respectively.

$$d_L = (-\frac{1}{2})d$$

$$d_R = (\frac{1}{2})d$$

The left parallax image can be generated by moving the pixel values $I_t(x, y)$ of the first image in accordance with $d_L$. Similarly, the right parallax image can be generated by moving the pixel values $I_t(x, y)$ of the first image in accordance with $d_R$. However, it is possible that an area (hereinafter referred to as a hole) will occur in which no pixel value is assigned simply by moving the pixel values. To such a hole, peripheral pixel values, for example, are assigned. Although the case of generating two parallax images has been described above, it is sufficient if similar processing is executed in the case of multi-parallax images.

The third depth information employed in the parallax image generating apparatus of the first embodiment will be described.

Assume, for example, that an image of a room and a person therein is the first image. In this case, a plurality of depth distributions are estimated by, for example, assigning the depths of the room to a model, or acquiring motion vectors, and combining the estimated distributions to generate first depth information. Further, unevenness information (second depth information) is acquired by estimation by detecting the person in the first image. The thus-obtained first and second depth information items must be combined. However, the reproduction range of the unevenness information is extremely narrower than that of the depth distribution information of the entire image. Accordingly, if the first and second depth information items are combined by the same method as that for acquiring the first and/or second depth information, the unevenness of the object (person) cannot be sufficiently expressed, with the stereoscopic effect of the depth distributions kept in the image.

Figure 6A:
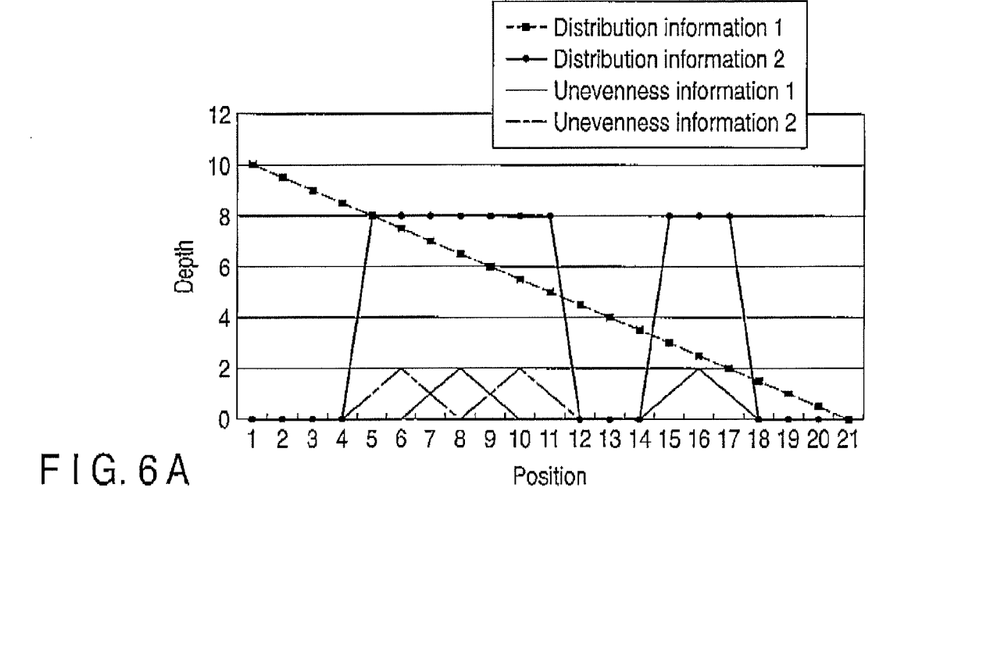
FIGS. 6A and 6B are graphs illustrating examples of depth information items.
Figure 6B:
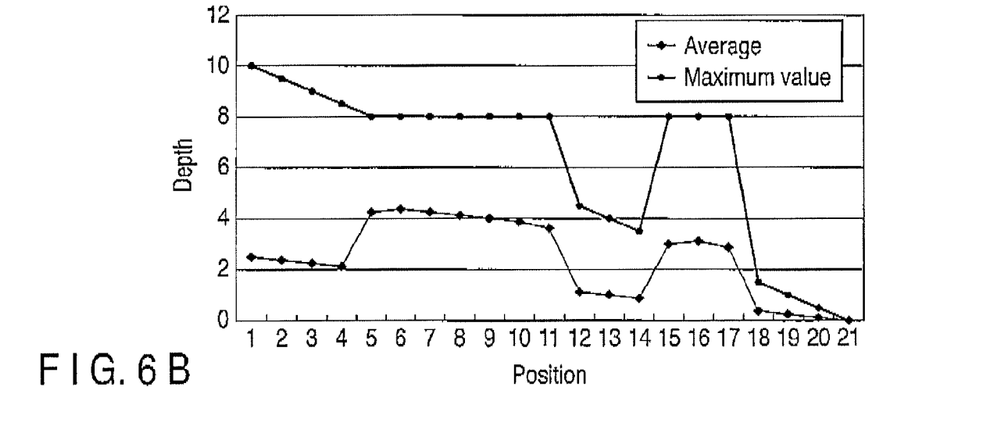
Figure 7A:
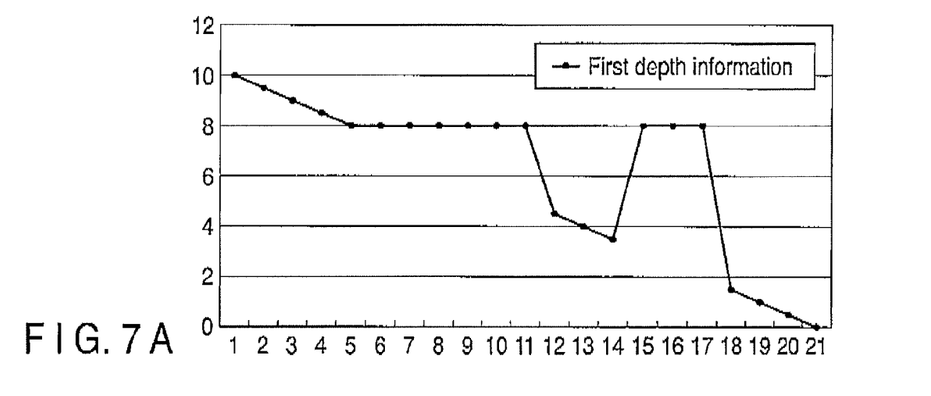
FIGS. 7A and 7B are graphs illustrating examples of first and second depth information items.
Figure 7B:
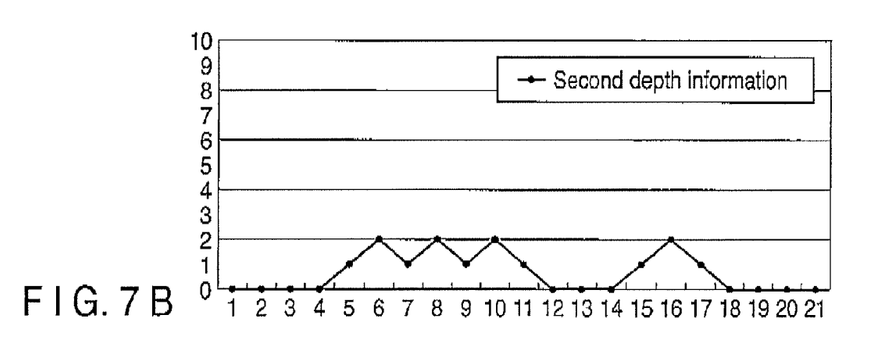
Figure 8:
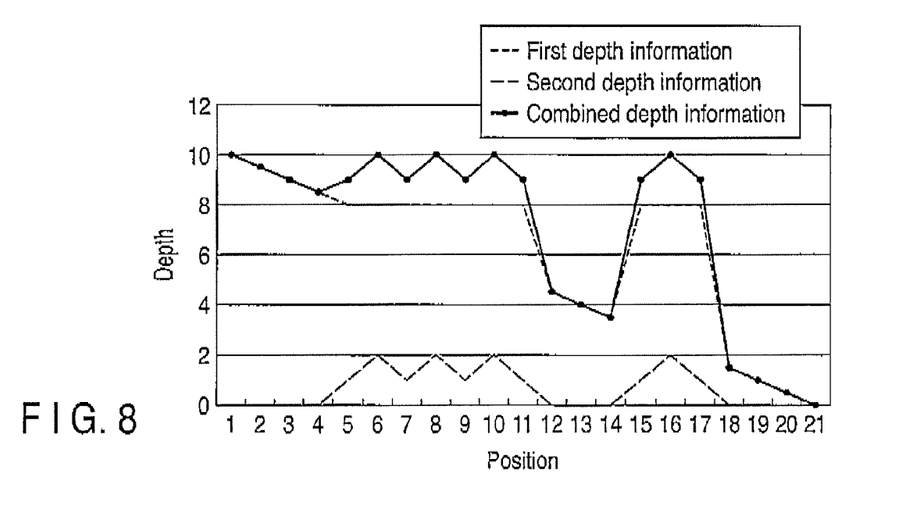
FIG. 8 is a graph illustrating an example of third depth information.

In FIGS. 6 to 8, the horizontal axis indicates the pixel position, and the vertical axis indicates the depth information.

FIGS. 6A and 6B show examples of depth information. FIG. 6A shows test patterns of the depth information. In FIGS. 6A and 6B, "0" indicates the rearmost position and "10" indicates the front position. Between this depth information and the above-mentioned one, the magnitude relation between the front position and the rearmost position is inverted. Distribution information 1 and distribution information 2 indicate examples generated by the estimation units 101($n$), and unevenness information 1 and unevenness information 2 indicate examples generated by the estimation units 201($m$).

FIG. 6B shows the average information of the distribution information items 1 and 2 and the unevenness information items 1 and 2, and the information obtained by selecting maximum values at respective positions in the test patterns of FIG. 6A, and combining them. In the average information, the depth dynamic range indicated by the distribution information items is compressed, and therefore the unevenness information is concealed. In contrast, in the latter information, the depth distribution of the face is completely concealed, although the depth dynamic range of the entire room is kept. This is because the absolute depth distribution information on the entire image and the relative unevenness information on the object (face) are combined together. The term "absolute" means the absolute depth with reference to the depth reproduction range of $0 \leq z \leq Z$, while the term "relative" means the relative depth in a local object area included in the entire image. The reproduction range of the relative depth information differs from that of the absolute depth information. Namely, the values of the absolute depth information differ in technical meaning from those of the relative depth information. Accordingly, if the absolute depth information and the relative depth information are combined by the same method, the resultant combination values do not sufficiently reflect the details of the image.

FIG. 7A shows first depth information obtained by combining the distribution information items 1 and 2 shown in FIG. 6A. FIG. 7B shows second depth information obtained by combination based on the distribution information items 1 and 2 shown in FIG. 6A. In both syntheses, a method of selecting information on the depth closest to the front plane at the same horizontal position was employed.

FIG. 8 shows third depth information obtained by combining the first and second depth information items shown in FIGS. 7A and 7B. Actually, the first and second depth information items are added.

By combining the first and second depth information items using a method different from the methods of acquiring the first and second depth information items, a parallax image can be generated in which the unevenness of an object included in an image is sufficiently expressed while keeping the stereoscopic effect resulting from the depth distribution in the image.

Second Embodiment

Figure 9:
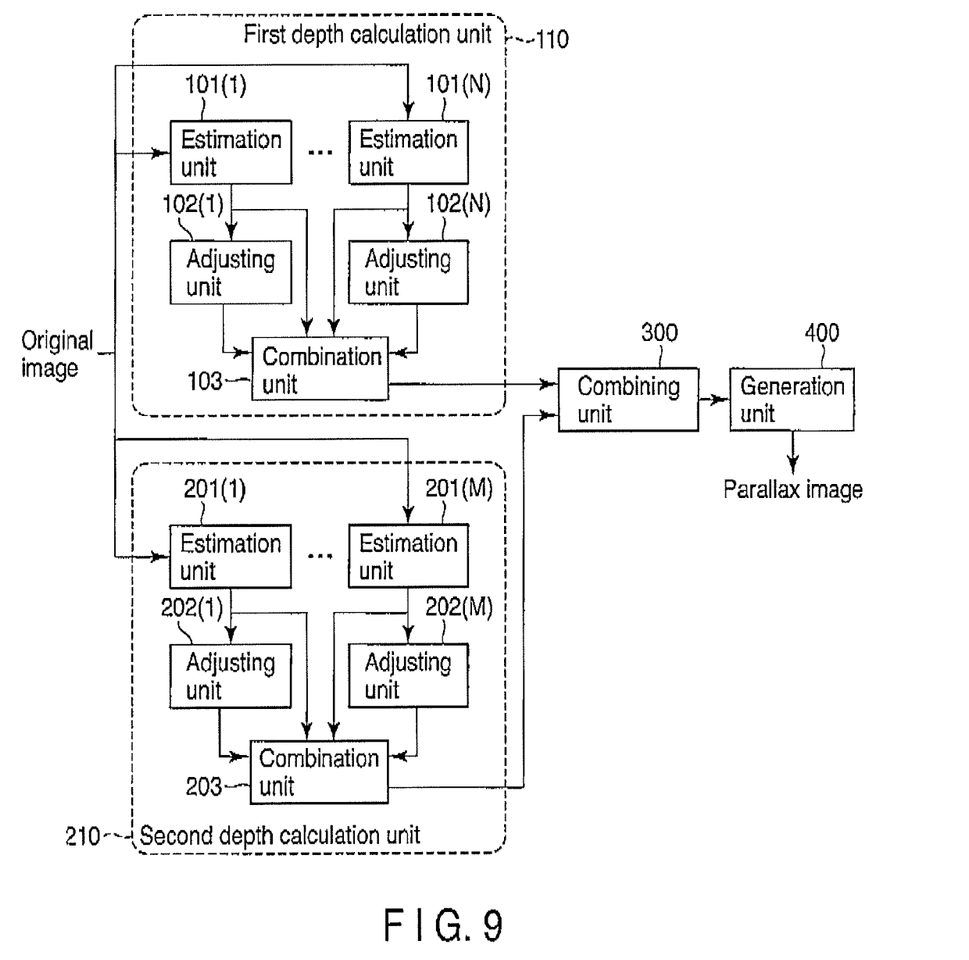
FIG. 9 is a block diagram illustrating an example of a model for converting depth information into parallax information.

FIG. 9 shows a parallax image generating apparatus according to a second embodiment. The parallax image generating apparatus of the second embodiment differs from that shown in FIG. 1B in that the former has a function of adjusting depth information.

Adjusting units 102($n$) adjust the respective distribution information items generated by the estimation units 101($n$). For instance, when the estimation unit 101(1) outputs depth information in the range of $0 \leq z \leq Z$, and the estimation unit 101(2) outputs depth information in the range of $100 \leq z \leq Z$, it is necessary to adjust the output range to the same range. To this end, the adjusting units 102($n$) adjust the different depth ranges to a certain range by, for example, fixing a point (hereinafter, a fixed point) (at, for example, Z) and broadening or narrowing the depth ranges. Further, if a certain estimation unit 101($n$) has a low reliability, its depth range is narrowed to the rear side to reduce the influence of depth information of low reliability.

Adjusting units 202($m$) adjust the respective second depth information items generated by the estimation units 201($m$). The adjusting units 202($m$) may employ the same adjusting methods as those the adjusting units 102($n$). If the fixed point is set at 0, the characteristic of the relative unevenness information can be effectively utilized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A parallax image generating apparatus for generating, using a first image, a parallax image with a parallax therebetween, comprising a processor configured to:
   estimate distribution information items indicating distributions of first depths in the first image, the distribution information items falling within a first depth range to be reproduced;
   combine the distribution information items by using a first combination method to generate first depth information;
   estimate unevenness information items indicating relative unevenness of one or more objects in the first image, the unevenness information items falling within a second depth range to be reproduced, the second depth range being substantially narrower than the first depth range;
   combine the unevenness information items by using the first combination method to generate second depth information, wherein the first combination method selects an unevenness information item with a minimum value among the unevenness information items to be the first depth information;
   combine the first depth information and the second depth information by using a second combination method different from the first combination method, to generate third depth information; and generate the parallax images based on the third depth information and the first image.

2. The apparatus according to claim 1, wherein the processor is further configured to select, from the distribution information items, a depth closest to a front plane from those of second depths corresponding to a first position in the first image on the front plane, the depth range being defined by the front plane and a rear plane.

3. The apparatus according to claim 2, wherein the processor is further configured to adjust depth information before generating first depth information and third depth information, respectively.

4. The apparatus according to claim 2, wherein the processor is further configured to add a third depth corresponding to the first position and indicated by the first depth information, to a fourth depth corresponding to the first position and indicated by the second depth information, generating the third depth information.

5. The apparatus according to claim 2, wherein the processor is further configured to multiply a third depth corresponding to the first position and indicated by the first depth information, by a fourth depth corresponding to the first position and indicated by the second depth information, generating the third depth information.

6. The apparatus according to claim 1, wherein the processor is further configured to:

detect a plurality of types of objects in the first image;
generate, by estimation, unevenness information items corresponding to the detected types of the objects; and
combine the unevenness information items.

7. The apparatus according to claim 1, wherein the processor is further configured to generate, by estimation, the distribution information items based on a motion between the first image and a second image to be displayed at a time different from a display time of the first image.

8. The apparatus according to claim 1, wherein the processor is further configured to determine a type of a pattern in the first image, and generates the distribution information items based on a determination result.

9. A parallax image generating apparatus for generating, using a first image, a parallax image with a parallax therebetween, comprising a processor configured to:

estimate distribution information items indicating distributions of first depths in the first image, the distribution information items falling within a first depth range to be reproduced;

combine the distribution information items by using a first combination method to generate first depth information;

estimate unevenness information items indicating relative unevenness of one or more objects in the first image, the unevenness information items falling within a second depth range to be reproduced, the second depth range being substantially narrower than the first depth range;

combine the unevenness information items by using the first combination method to generate second depth information, wherein the first combination method selects an unevenness information item with a minimum value among the unevenness information items to be the first depth information; and combine the first depth information and the second depth information by using a second combination method different from the first combination method, to generate third depth information.

* * * * *